UNITED STATES PATENT OFFICE.

ERNEST WILLIAM COOKE, OF NEW YORK, N. Y., ASSIGNOR, BY MESNE ASSIGNMENTS, TO THE COKEL COMPANY, A CORPORATION OF NEW JERSEY.

CRANBERRY FOOD PRODUCT AND PROCESS OF PREPARING THE SAME.

984,749.  Specification of Letters Patent.  Patented Feb. 21, 1911.

No Drawing.  Application filed January 11, 1905. Serial No. 240,667.

*To all whom it may concern:*

Be it known that I, ERNEST W. COOKE, a citizen of the United States, residing at New York, in the county and State of New York, have invented certain new and useful Improvements in Cranberry Food Products and Processes of Preparing the Same; and I do declare the following to be a full, clear, and exact description of the invention, such as will enable others skilled in the art to which it appertains to make and use the same.

This invention relates to cranberry food products and processes of preparing the same; and it comprises as a new article of manufacture a cranberry food product embracing transversely sliced, dried, seedless slices of cranberries, having the natural cellular structure of the cranberry substantially unruptured and unchanged save along the line of section; and it also comprises a process of preparing such product wherein cranberries are sliced in such a manner as to expose the seed vessels, are freed from seed by agitation and are dried at a temperature insufficient to produce substantial changes in the structure or composition of such cranberries; all as more fully hereinafter set forth and as claimed.

Desiccated seedless cranberries are desirable for many reasons, but heretofore no article has been produced, so far as I am aware, in the prior art which needed only the addition of water to produce stewed cranberries, cranberry jam, jelly, etc., of the same character as that which can be prepared from the fresh fruit. Some sort of comminution is desirable for desiccation since in the natural fruit the cells are protected by the skin of such fruit and the moisture cannot be removed. If the cranberry be crushed, as it has sometimes been proposed, as a preliminary to desiccation, the seeds, which in their natural condition are contained in special seed vessels, are crushed into the pulp and it is substantially impossible to separate them therefrom afterward. Moreover, in so crushing the cranberry, the natural cellular structure of the plant is destroyed and it is substantially impossibly to dry out throughly, perfectly and uniformly the moisture from the crushed material. In the crushing the natural vessels are pulped. Dried, crushed cranberries always give a sticky conglomerate. However thin such cranberries be spread, some portion of the material is inaccessible to the action of air in desiccation and remains more or less moist unless temperatures be carried very high. Furthermore, the juices are, so to speak, smeared over the outside of the crushed cell walls. If, on the other hand, the cranberries be sliced prior to desiccation this smearing of the juices does not occur. And since substantially all of the cells are unruptured, only those along the line of section being cut, the fruit in the thin slices may be dried as an assemblage of cells, each cell inclosing its juices. If the material be dried at low temperatures and under the proper conditions the final result is a slice of cranberry which is substantially like the original fruit save in that it is desiccated. The material loses practically nothing but water in this drying operation and the juices and other constituents are not changed, so that upon the addition of water, jams, etc. can be obtained like those which may be produced from the original cranberry. In slicing a further advantageous result is obtained in that the seeds may be exposed and may be removed by agitation.

In the preferred embodiment of this invention the cranberries are first divided into comparatively thin slices. The slicing is best transverse to or at least across the natural axes of the fruit. After thus slicing, the cut slices may be agitated so as to remove all or a greater part of the exposed seeds. This may be done in various ways, such as by placing the slices in water which is kept agitated by suitable means, or by the use of a shaking sieve or screen, or by the combination of both methods. I prefer to remove the seeds in this operation by what may be termed a "winnowing" action, that is to say, by placing them upon a shaking screen or sieve and directing a current of dry air over the same. The slices are separated by the air from the seeds which drop through the screens. The slices are then submitted to the action of dry air, whereby they are dehydrated. This operation may be conveniently and efficiently performed in the apparatus disclosed and claimed in my prior application for patent, filed January 29, 1904, Serial No. 191,538, but the particular form of dehydrating apparatus used is not of the essence of my present invention.

The seeds may be removed prior to the dehydration as stated, or may be removed during the dehydration itself. Or the seeds may be removed during both operations. The seeds may also be conveniently removed from the dried slices remaining after the dehydration, or if all the seeds have not been removed during the prior operations, the remainder may be so removed. The seeds are exposed during the slicing operation and it is immaterial at which subsequent stage they are removed. It is convenient, however, after the slicing operation exposing the seeds, to remove at least the bulk of such seeds during the drying or desiccating operation as by passing a current of dry air over them under such conditions as to give a winnowing action.

The dry product so obtained consists of desiccated transverse slices of cranberry freed from seed but otherwise like the original cranberry and upon the addition of water, giving products like those yielded by the original cranberry, save for the absence of seed. For the most part, the cells in the material are unruptured and still inclose their original contents.

What I claim is:—

1. The process of producing a dehydrated seedless cranberry food product, which consists in cutting the berries into thin slices to expose the seeds, agitating said slices while passing a current of dry air over the same to remove the seeds, and subjecting the remaining material to the dehydrating action of dry air.

2. The process of producing a dehydrated seedless cranberry food product, which consists in cutting the berries into thin slices to expose the seeds, agitating said slices while passing a current of dry air over the same to remove a portion of the seeds, subjecting the slices to the dehydrating action of dry air, and finally agitating them again to remove the remaining seeds.

3. The process of producing a dehydrated seedless cranberry food product, which comprises cutting cranberries across their axes so as to expose the seeds, and dehydrating the cut cranberries and agitating them to separate the seeds therefrom.

4. The process of producing a dehydrated seedless cranberry food product, which comprises cutting cranberries transversely of their axes to expose the seeds, agitating the cut cranberries to remove the seeds, and then dehydrating the cut cranberries.

5. The process of producing a dehydrated seedless cranberry food product, which consists in cutting the cranberries across their axes to expose the seeds, and agitating the cut cranberries and subjecting them to the action of dry air to dehydrate them and rid them of their seeds.

6. As a new article of manufacture, sliced, desiccated and seedless cranberries, the line of slicing being transverse to the fruit axis and the major part of natural cells in said cranberries being unbroken, said cranberries upon moistening giving a material like fresh cranberries save for the absence of seeds.

In testimony whereof, I affix my signature, in presence of two witnesses.

ERNEST WILLIAM COOKE.

Witnesses:
H. H. BROCKWAY,
JOHN S. POTTER.